United States Patent
Iwai et al.

(10) Patent No.: US 7,865,281 B2
(45) Date of Patent: Jan. 4, 2011

(54) FAILURE DIAGNOSIS SYSTEM, AND VEHICLE-MOUNTED ECU FOR USE IN THE FAILURE DIAGNOSIS SYSTEM

(75) Inventors: Atsushi Iwai, Tajimi (JP); Kiyonari Kato, Toki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/437,625

(22) Filed: May 8, 2009

(65) Prior Publication Data

US 2009/0287370 A1 Nov. 19, 2009

(30) Foreign Application Priority Data

May 13, 2008 (JP) .............................. 2008-125897

(51) Int. Cl.
*G01M 17/00* (2006.01)
*G06F 13/00* (2006.01)

(52) U.S. Cl. .......................................... 701/35; 701/33

(58) Field of Classification Search ........................ None
See application file for complete search history.

(56) References Cited

U.S. PATENT DOCUMENTS

| 6,195,602 | B1 * | 2/2001 | Hazama et al. | 701/48 |
| 2004/0088087 | A1 * | 5/2004 | Fukushima et al. | 701/32 |
| 2004/0233077 | A1 * | 11/2004 | Mizusawa | 341/87 |
| 2007/0233341 | A1 * | 10/2007 | Logsdon | 701/29 |
| 2009/0271063 | A1 * | 10/2009 | Yasue et al. | 701/33 |

OTHER PUBLICATIONS

Patent Abstracts of Japan; JP2006193146A; Jul. 2006.*
Patent Abstracts of Japan; JP07210236A; Aug. 1995.*
Patent Abstracts of Japan; JP07002032A; Jan. 1995.*

* cited by examiner

*Primary Examiner*—Michael J. Zamelli
(74) *Attorney, Agent, or Firm*—Gifford, Krass, Sprinkle, Anderson & Citkowski, P.C.

(57) ABSTRACT

A failure diagnosis system that erases diagnostic information applied to a vehicle that includes an ECU for that stores a vehicle identification number (VIN) and diagnostic information (hereinafter, referred to as "VIN storage ECU"), and an ECU that does not store the vehicle identification number but stores the diagnostic information (hereinafter, referred to as "other ECU") is characterized by being constructed so as to erase the diagnostic information stored in the VIN storage ECU and also erase the diagnostic information stored in the other ECU in connection with the writing of the vehicle identification number stored in the VIN storage ECU.

10 Claims, 7 Drawing Sheets

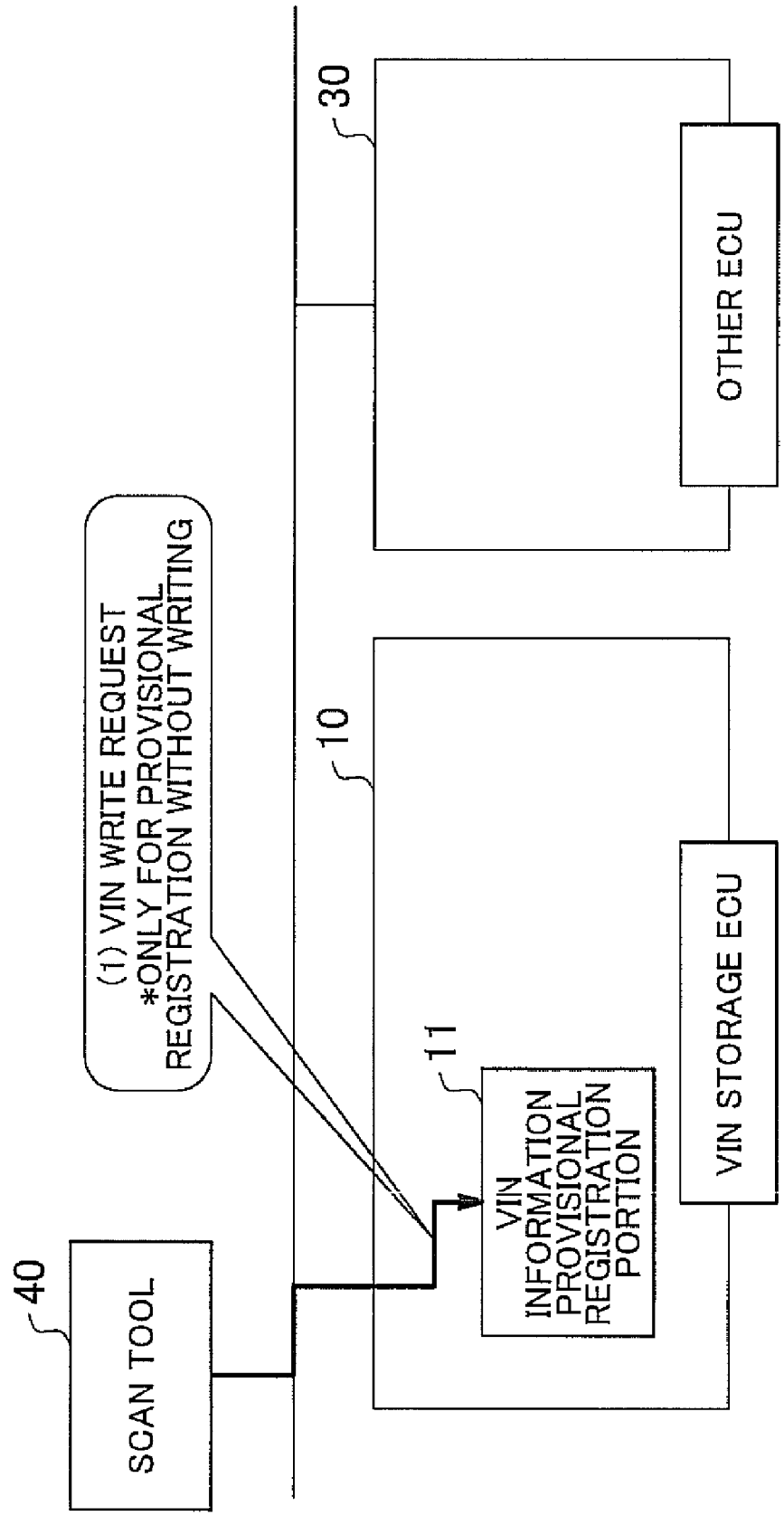

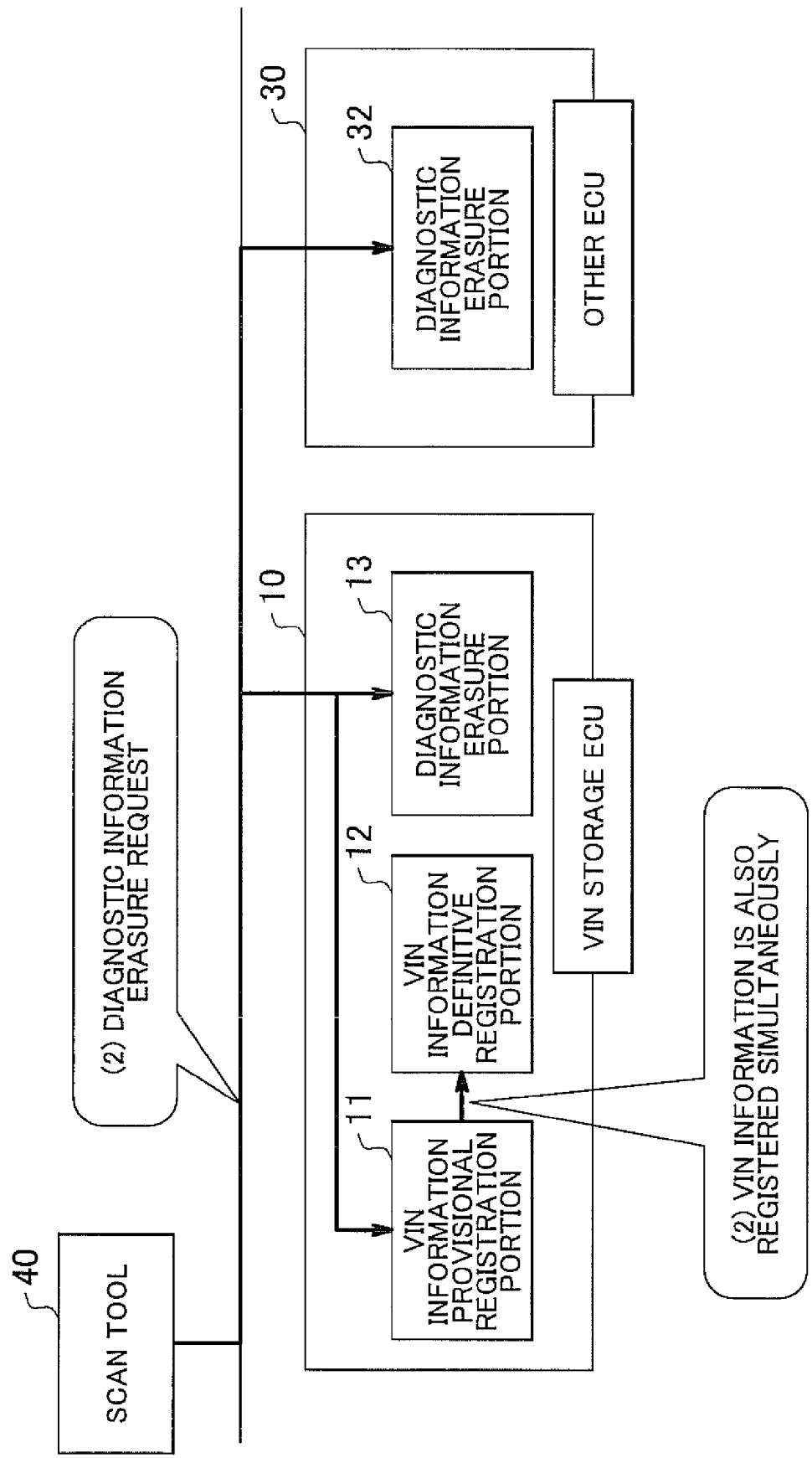

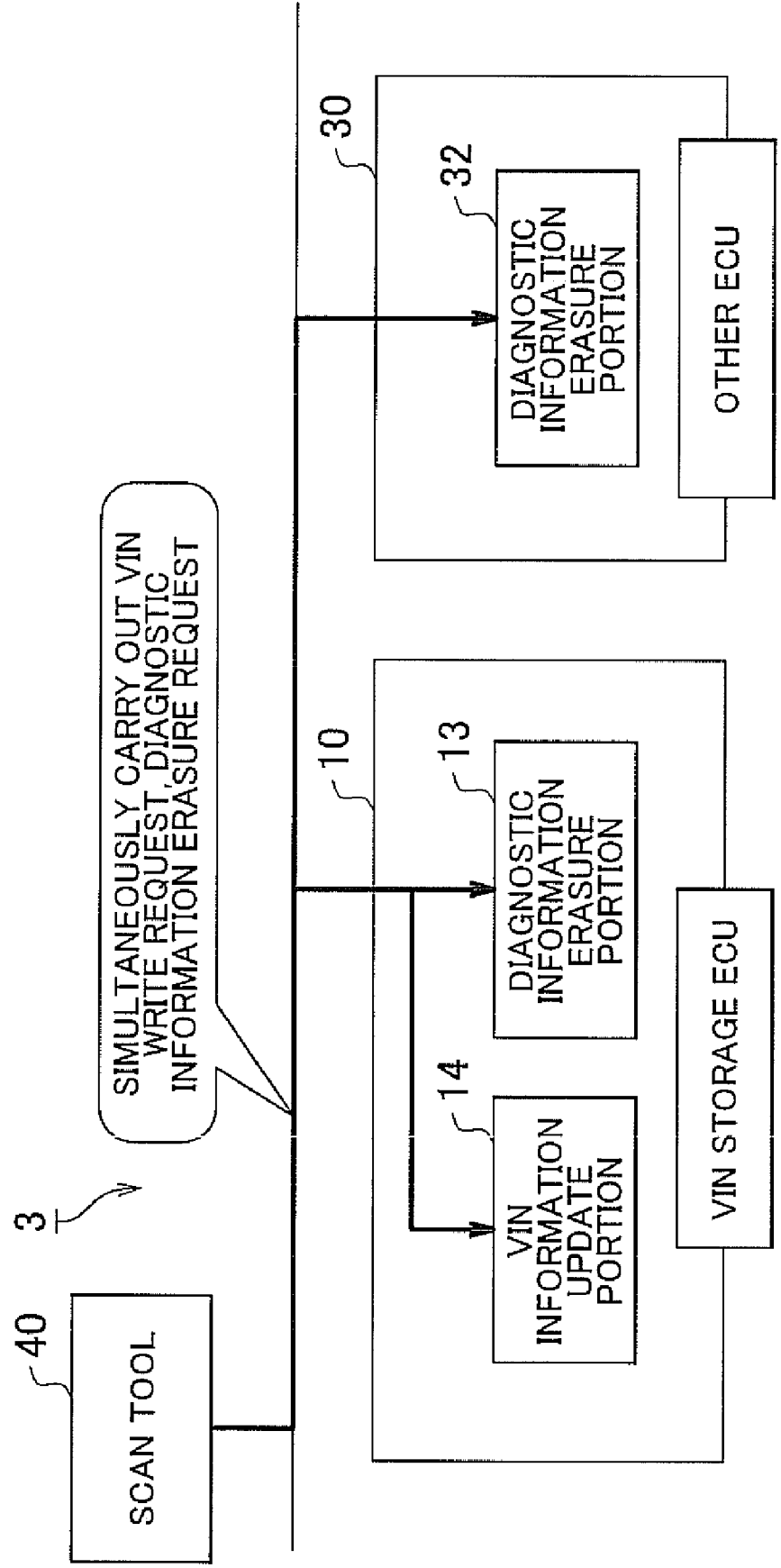

FAILURE DIAGNOSIS SYSTEM, AND VEHICLE-MOUNTED ECU FOR USE IN THE FAILURE DIAGNOSIS SYSTEM

INCORPORATION BY REFERENCE

The disclosure of Japanese Patent Application No. JP-2008-125897 filed on May 13, 2008 including the specification, drawings and abstract is incorporated herein by reference in its entirety.

BACKGROUND OF THE INVENTION

1. Field of the Invention

The invention relates to a failure diagnosis system, and a vehicle-mounted ECU for use in the failure diagnosis system.

2. Description of the Related Art

There is a known technology in which when an erasure request on diagnostic information is received from a failure diagnosis device that is connected to a vehicle from the outside of the vehicle, the diagnostic information in a master CPU is erased, and then the erasure request is also output to other CPUs (e.g., see Japanese Patent No. 3203884).

Recently, the CARB OBD2 regulations were revised (December, 2007) (described in detail in conjunction with embodiments of the invention), requiring a process of erasing diagnostic information at the time of writing a vehicle identification number (VIN). The erasure of diagnostic information needs to be substantially the same as the erasure of diagnostic information that is requested by a scan tool, and if the diagnostic information is not erased, the VIN writing must not be executed.

However, along with the recent trend toward multi-functions of a vehicle system, the number of ECUs employed in the system is increasing, and there are cases where, besides the ECU that retains the VIN, there also exists another ECU that retains diagnostic information that needs to be erased at the time of writing the VIN. In such a case, the other ECU do not have a measure for knowing that an ECU retaining the VIN was subjected to the writing of the VIN, and therefore there is a risk that the diagnostic information of the other ECU may remain.

SUMMARY OF THE INVENTION

The invention provides a failure diagnosis system capable of efficiently erasing the diagnostic information of each ECU that needs to be erased at the time of VIN writing, and a vehicle-mounted ECU for use in the failure diagnosis system.

A first aspect of the invention relates to a failure diagnosis system that erases diagnostic information. The failure diagnosis system includes a VIN storage ECU that stores a vehicle identification number and diagnostic information, and an other ECU that does not store the vehicle identification number but stores the diagnostic information. The VIN storage ECU and the other ECU execute erasure of the diagnostic information stored in the VIN storage ECU and erasure of the diagnostic information stored in the other ECU in connection with execution of writing of the vehicle identification number in the VIN storage ECU.

A second aspect of the invention relates to a vehicle-mounted ECU. The vehicle-mounted ECU stores a vehicle identification number and a diagnostic information. If a vehicle identification number write request is received, the vehicle-mounted ECU provisionally registers the vehicle identification number in accordance with the write request. Then, if an erasure request on the diagnostic information is received, the vehicle-mounted ECU carries out writing of the vehicle identification number by definitively registering the vehicle identification number provisionally registered, and erases the diagnostic information presently stored, and requests an other ECU that does not store a vehicle identification number but stores diagnostic information to erase the diagnostic information presently stored.

A third aspect of the invention relates to a vehicle-mounted ECU. The vehicle-mounted ECU stores a vehicle identification number and diagnostic information. If a vehicle identification number write request is received the vehicle-mounted ECU carries out writing of the vehicle identification number pursuantly to the write request, and erases the diagnostic information presently stored, and requests an other ECU that does not store a vehicle identification number but stores diagnostic information to erase the diagnostic information presently stored.

A fourth aspect of the invention relates to a failure diagnosis method of erasing diagnostic information from a VIN storage ECU that stores a vehicle identification number and diagnostic information, and from an other ECU that does not store the vehicle identification number but stores the diagnostic information. The failure diagnosis method executes erasure of the diagnostic information stored in the VIN storage ECU and erasure of the diagnostic information stored in the other ECU, in connection with execution of writing of the vehicle identification number in the VIN storage ECU.

According to the forgoing aspects, a failure diagnosis system capable of efficiently erasing diagnostic information that is to be erased, from ECUs, at the time of the VIN writing, and a vehicle-mounted ECU for use in the failure diagnosis system can be obtained.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 5A and 5B are diagrams collectively showing a flow of a process that is performed on a VIN write request and the diagnostic information erasure request in the failure diagnosis system of the first embodiment;

FIG. 7 is a system construction diagram showing a construction of portions of a failure diagnosis system according to a third embodiment of the invention.

DETAILED DESCRIPTION OF EMBODIMENTS

Best modes for carrying out the invention will be described hereinafter with reference to the drawings.

Figure 1:
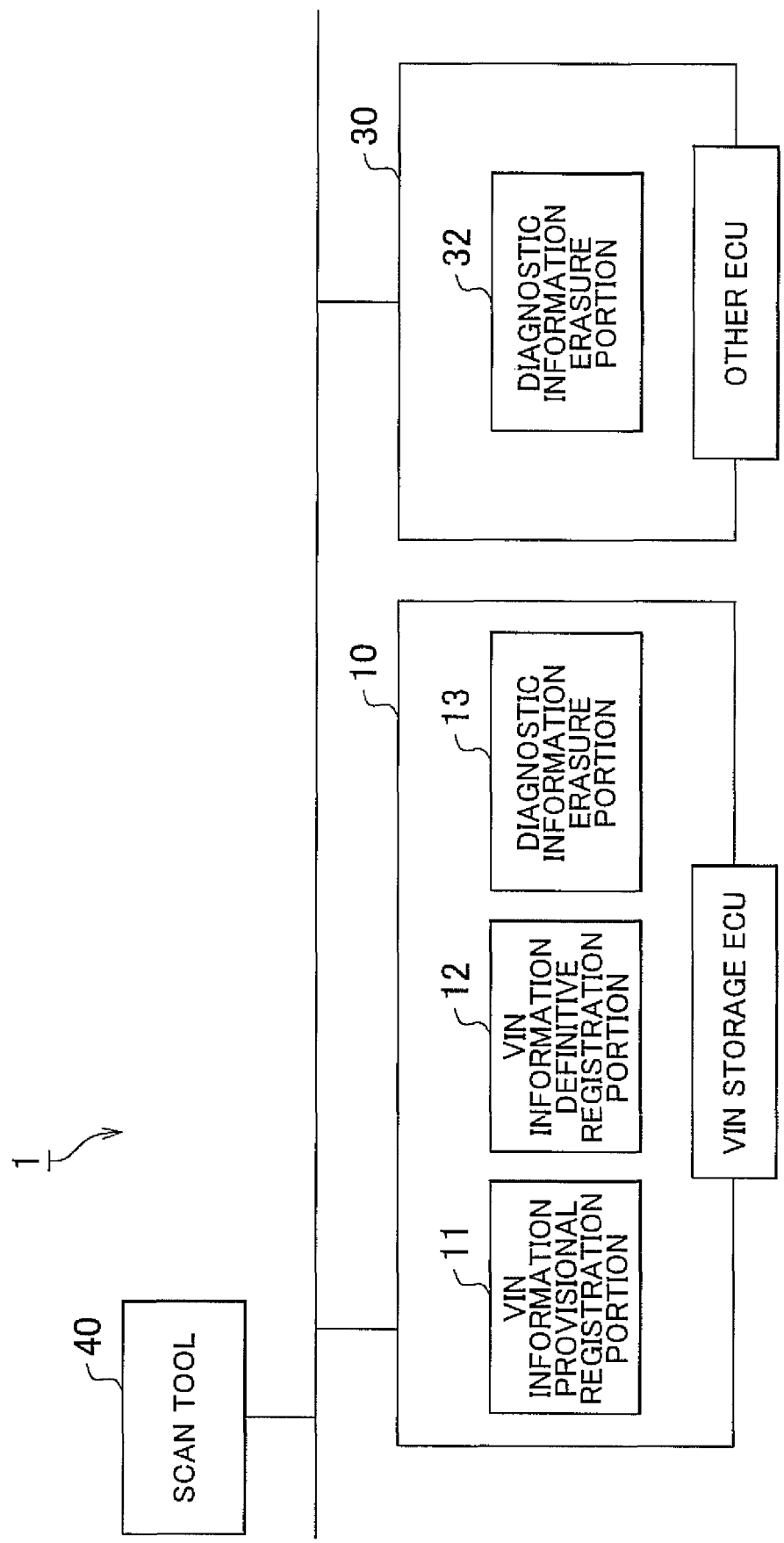
FIG. 1 is a system construction diagram showing a construction of portions of a failure diagnosis system according to a first embodiment of the invention.

FIG. 1 is a system construction diagram showing a construction of portions of a failure diagnosis system 1 according to a first embodiment of the invention.

The failure diagnosis system 1 includes an ECU that has a vehicle identification number (VIN) (hereinafter, referred to as "VIN storage ECU") 10, other ECUs that do not have the VIN (hereinafter, regarded as a single ECU and referred to as "other ECU") 30, and a scan tool 40 capable of communicating with the VIN storage ECU 10 and the other ECU 30. A hardware construction of each of the VIN storage ECU 10 and the other ECU 30 is made up of a microcomputer, and is made up of a CPU, a ROM, a RAM, etc. that are interconnected by a bus (not shown).

The VIN storage ECU 10 is an ECU that stores the VIN, and that also carries out an on-board diagnosis (OBD) and stores diagnostic information. The diagnostic information is information related to emissions from the vehicle. In order to prevent atmospheric pollution, the VIN storage ECU 10 stores a result of failure diagnosis (diagnostic information) when an abnormality occurs in an exhaust gas device (not shown) or the like. In this embodiment, as the diagnostic information, one of "FAILED", "NORMAL" and "UNKNOWN" is stored, and the initial state of the diagnostic information is "UNKNOWN". That is, the diagnostic information is reset to "UNKNOWN" when a process of erasing diagnostic information (described below) is carried out. The diagnostic information representing "NORMAL" is set, for example, in the case where an abnormality relevant to an exhaust gas device is not detected while a vehicle traveled a predetermined distance. The diagnostic information representing "FAILED" is set in the case where an abnormality relevant to the exhaust gas device is detected. The diagnostic information representing "FAILED" may further include information that represents the site of failure, a cause of failure, etc.

The VIN storage ECU 10 is typically a specific one of a plurality of ECUs provided in a vehicle, but may also include two or more ECUs. The VIN storage ECU 10 is typically an EFI (electronic fuel injection) ECU that controls the engine.

The other ECU 30 is an ECU that does not store the VIN, and more specifically an ECU that carries out an OBD, and stores diagnostic information (diagnostic information related to emissions). The other ECU 30 may be a plurality of ECUs. The other ECU 30 is typically an ECU that controls the transmission, and, in the case of a hybrid vehicle, may also be a hybrid ECU that controls a hybrid system (a converter or an inverter for driving a vehicle-travel electric motor, or the like), an electric cell ECU that monitors the state of a high-voltage-system cell that functions as a power source for a travel motor, or the like.

The scan tool 40 is typically a tool that is installed at a car maker, a car dealer, a vehicle inspection station, etc., and that makes a request for acquisition of diagnostic information from the VIN storage ECU 10 and the other ECU 30, or an erasure request on the diagnostic information in the VIN storage ECU 10 and the other ECU 30, a write request on the VIN, etc., through bidirectional communication with the VIN storage ECU 10 and the other ECU 30. The scan tool 40 is expected to be used by a technical service person at a dealer, a vehicle inspection station, etc., and may be a small-size terminal that is portable and operable by a person. The form of the communication between the scan tool 40 and the VIN storage ECU 10 or the other ECU 30 may be an arbitrary wireless communication, or may also be an arbitrary cable communication.

Incidentally, the diagnostic information that is output from the VIN storage ECU 10 or the other ECU 30 in response to the diagnostic information acquisition request from the scan tool 40 is used for clarification of the cause of a failure (for data mining), or for vehicle inspection. With regard to the latter case, the vehicle passes the vehicle inspection only when all the pieces of diagnostic information output from the VIN storage ECU 10 and the other ECU 30 represent "NORMAL". On the other hand, when any one of the pieces of diagnostic information output from the VIN storage ECU 10 and the other ECU 30 represents "UNKNOWN" or "FAILED", the vehicle fails the inspection.

In the first embodiment, the scan tool 40 is constructed so as to send VIN that is to be written, together with a VIN write request, to the VIN storage ECU 10, in response to a specific input operation performed by a service person (an input operation for writing the VIN). Incidentally, information about the VIN to be written is generated from information that is input to the scan tool 40 by a service person. In the following description, the VIN write request contains information that represents the VIN to be written. Besides, the scan tool 40 is constructed so as to send a request for erasure of the diagnostic information stored in the VIN storage ECU 10 and the other ECU 30, in response to another specific input operation performed by a service person (an input operation for erasing the diagnostic information).

Incidentally, the need to write the VIN arises, typically, when the VIN storage ECU 10 is replaced due to a failure or the like. In this case, the VIN to be written is the same as the VIN that is stored in the VIN storage ECU 10 before the replacement.

Incidentally, the content of the revision of the CARB OBD2 regulations (extracted from the original text" is as follows. The CARB refers to the California Air Resources Board, and the OBD refers to on-board diagnostics.

"CARB OBD2 Title 13(g)(4.8.2)—For 2012 and subsequent model year vehicles, if the VIN is reprogrammable, all emission-related diagnostic information (i.e., all information required to be erased in accordance with SAEJ 1979 specifications when a Mode/Service $04 clear/reset emission-related diagnostic information command is received) shall be erased in conjunction with the reprogramming of the VIN.

Therefore, in order to comply with the CARB OBD2 regulations, it is necessary to perform a diagnostic information erasure process at the time of VIN writing. Besides, the erasure of the diagnostic information needs to be the same as the erasure of the diagnostic information requested from the scan tool. If the diagnostic information is not erased, the VIN writing must not be executed.

Therefore, in this embodiment, the foregoing characteristic construction efficiently realizes a VIN-writing-time diagnostic information erasure process that meets the CARB OBD2 regulations.

The VIN storage ECU 10, as shown in FIG. 1, includes a VIN information provisional registration portion 11, a VIN information definitive registration portion 12, and a diagnostic information erasure portion 13, as main functional portions that are related to the CARB OBD2 regulations.

Figure 2:
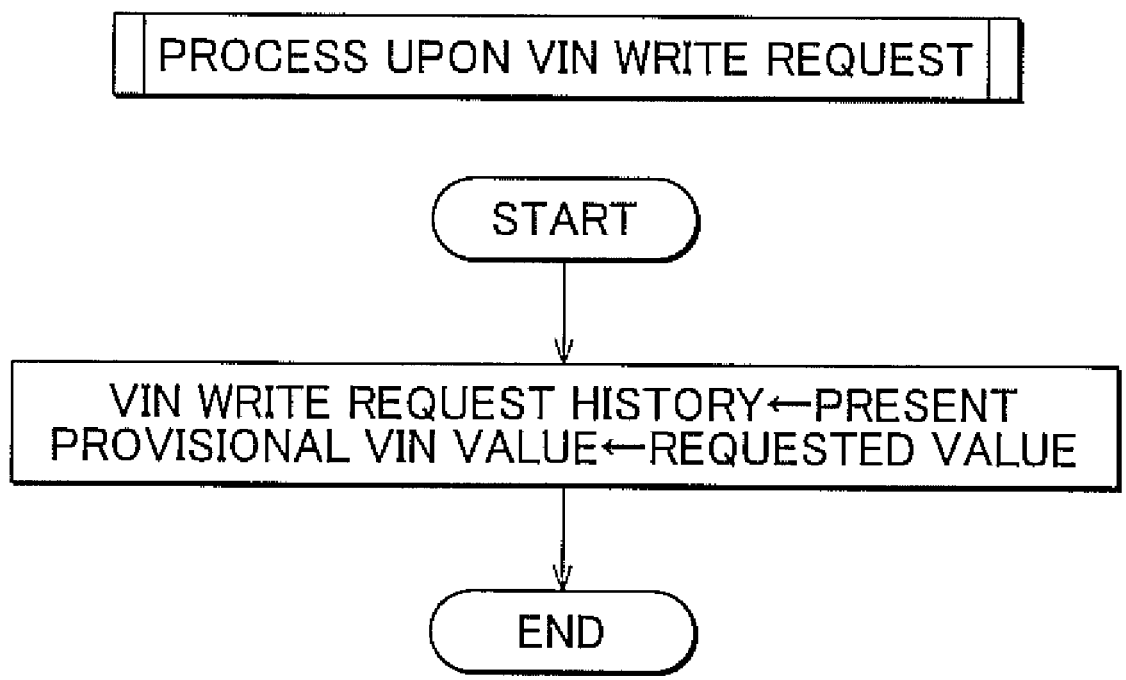
FIG. 2 is a diagram showing an example of a process that is executed by a VIN information provisional registration portion of a VIN storage ECU when a VIN write request is received.

The VIN information provisional registration portion 11, as shown in FIG. 2, sets a VIN write request history to "PRESENT", and also sets a provisional VIN value to a requested value (the VIN in accordance with the VIN write request). Thus, the VIN in accordance with the VIN write request is provisionally registered. This provisional VIN value (provisional registration value) is stored in a storing portion such as a volatile memory. The initial state of the VIN write request history is "ABSENT". The VIN write request history is set to the "PRESENT" in the case where there is a VIN write request. When the VIN write request history is set to "PRESENT", the "PRESENT" is maintained until a predetermined condition is satisfied. When the predetermined condition is satisfied, the VIN write request history is then initialized to the "ABSENT". The predetermined condition is, for example, the elapse of a predetermined time, the travel of the vehicle over a predetermined travel distance, or the stoppage of the engine. Likewise, the provisional registration value is stored in the volatile memory until a predetermined condition is satisfied. When the predetermined condition is satisfied, the provisional registration value is initialized to an initial value (no value). This predetermined condition, as in the case of the VIN write request history, may be the elapse of a predetermined time, the travel of the vehicle over a predetermined travel distance, or the stoppage of the engine.

Figure 3:
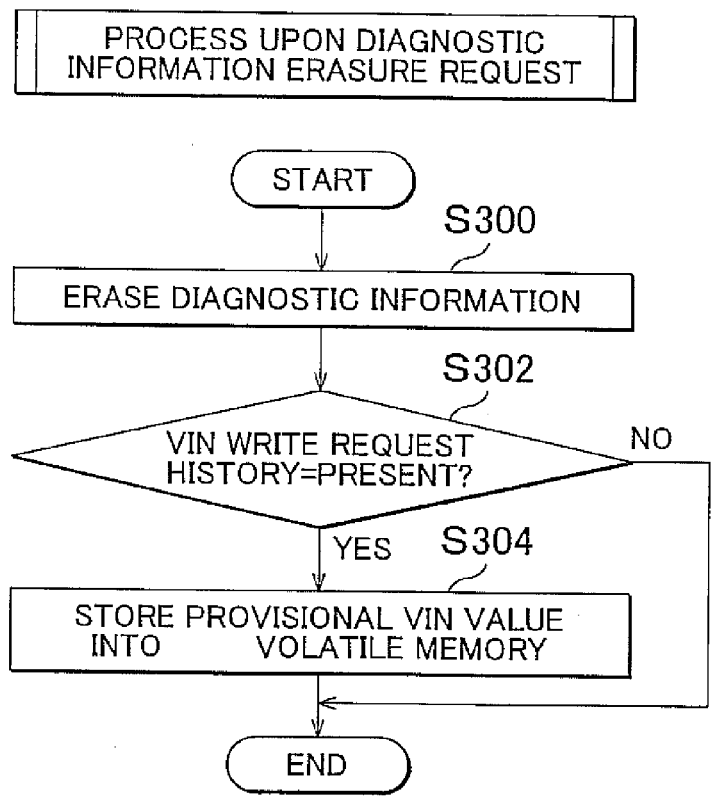
FIG. 3 is a diagram showing an example of a process that is executed by a VIN information definitive registration portion and a diagnostic information erasure portion of the VIN storage ECU when a diagnostic information erasure request is received.

The VIN information definitive registration portion 12 and the diagnostic information erasure portion 13, as shown in FIG. 3, erase the diagnostic information from the VIN storage ECU 10, and store the provisional VIN value into the volatile memory (definitively registered), in response to the diagnostic information erasure request from the scan tool 40.

Concretely, as shown in FIG. 3, in step 300, the diagnostic information erasure portion 13 erases the diagnostic information from the VIN storage ECU 10 in response to the diagnostic information erasure request from the scan tool 40. Thus, the diagnostic information of the VIN storage ECU 10 is reset to the initial value (e.g., the "UNKNOWN").

In step 302, the VIN information definitive registration portion 12 determines whether or not the VIN write request history is the "PRESENT", in response to the diagnostic information erasure request from the scan tool 40. If the VIN write request history is the "PRESENT", the process proceeds to step 304. If the diagnostic information erasure request is not the "PRESENT" (i.e., is the "ABSENT"), the process immediately ends.

In step 304, the VIN information definitive registration portion 12 definitively registers the provisional VIN value stored by the VIN information provisional registration portion 11, into the volatile memory (write in). Thus, the writing of the VIN into the VIN storage ECU 10 is completed. According to the process shown in FIG. 3, even if there exists the VIN write request from the scan tool 40, the VIN in accordance with the write request is not written into the VIN storage ECU 10, provided that there is no diagnostic information erasure request from the scan tool 40. Thus, it is possible to prevent the execution of writing into the VIN without erasing the diagnostic information.

The other ECU 30, as shown in FIG. 1, includes a diagnostic information erasure portion 32 as a main functional portion that is related to the CARB OBD2 regulations.

Figure 4:
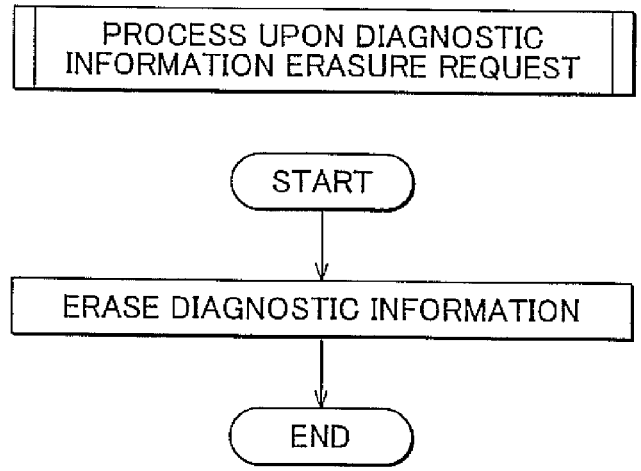
FIG. 4 is a diagram showing an example of a process that is executed by a diagnostic information erasure portion another ECU when the diagnostic information erasure request is received.

The diagnostic information erasure portion 32, as shown in FIG. 4, erases the diagnostic information from the other ECU 30 in response to the diagnostic information erasure request from the scan tool 40. Thus, the diagnostic information of the other ECU 30 is reset to the initial value (e.g., the "UNKNOWN").

Incidentally, the diagnostic information erasure request from the scan tool 40 that is received by the other ECU 30 is the diagnostic information erasure request described above with reference to FIG. 3, and is the same as the diagnostic information erasure request from the scan tool 40 that is received by the VIN storage ECU 10. That is, the diagnostic information erasure request from the scan tool 40 is broadcast, and is received by each of the other ECU 30 and the VIN storage ECU 10.

FIGS. 5A and 5B are diagrams collectively showing a flow of a process that is performed on the VIN write request and the diagnostic information erasure request in the foregoing failure diagnosis system of first embodiment. FIG. 5A shows a relation between the flow of a signal of the VIN write request and the content of processing the signal. FIG. 5B is a diagram showing the flow of a diagnostic information erasure request and the content of processing the signal.

A user (typically, a service person) who desires to perform the writing of a VIN (that includes the re-writing of the present VIN with a new VIN) first operates the scan tool 40 to input (send) the VIN write request from the scan tool 40 to the vehicle side. The VIN write request from the scan tool 40, as shown in FIG. 5A, is received by the VIN storage ECU 10, so that the provisional registration of the VIN information (the VIN whose writing is hoped for) is carried out by the VIN information provisional registration portion 11 (see FIG. 2).

Next, the user operates the scan tool 40 to input (send) the diagnostic information erasure request from the scan tool 40 to the vehicle side. The diagnostic information erasure request from the scan tool 40, as shown in FIG. 5B, is received by the VIN storage ECU 10 and the other ECU 30. As a result, the diagnostic information is erased from the VIN storage ECU 10 and the other ECU 30 (see step 300 in FIG. 3, and FIG. 4). When the diagnostic information has been erased, the definitive registration (writing) of the VIN provisionally registered in the VIN information provisional registration portion 11 is carried out by the VIN information definitive registration portion 12 (see step 304 in FIG. 3).

Thus, according to the first embodiment, at the time of the VIN writing, the diagnostic information related to emissions can be entirely erased, utilizing the existing functions of the scan tool 40 (the function of outputting the VIN write request and the diagnostic information erasure request). That is, even in the case where the diagnostic information related to emissions is stored in a plurality of ECUs (the VIN storage ECU 10 and the other ECU 30), the diagnostic information related to emissions can be entirely erased at the time of the VIN writing. Besides, since the system is constructed so that the VIN writing is accompanied by the erasure of the entire diagnostic information related to emissions, it is possible to certainly prevent the VIN writing from being carried out with a portion of the emission-related diagnostic information left unerased. That is, when there is a VIN write request, merely the provisional registration of the VIN is carried out. If this is not followed by a diagnostic information erasure request, the VIN writing is not carried out. Therefore, it is possible to certainly prevent the VIN writing from being carried out with a portion of the diagnostic information left unerased.

Incidentally, in the first embodiment, in order to utilize the existing functions of the scan tool 40, the VIN write request and the diagnostic information erasure request are generated by the separate operation inputs to the scan tool 40. However, it is also possible to expand or alter the functions of the scan tool 40 so that the VIN write request and the diagnostic information erasure request are simultaneously generated and input by a predetermined operation input performed on the scan tool 40 (which may be substantially the same fashion as a composite signal in a third embodiment as described below). In this case, the user can make the VIN write request and the diagnostic information erasure request by one operation, whereby the VIN writing work can be facilitated.

Figure 6:
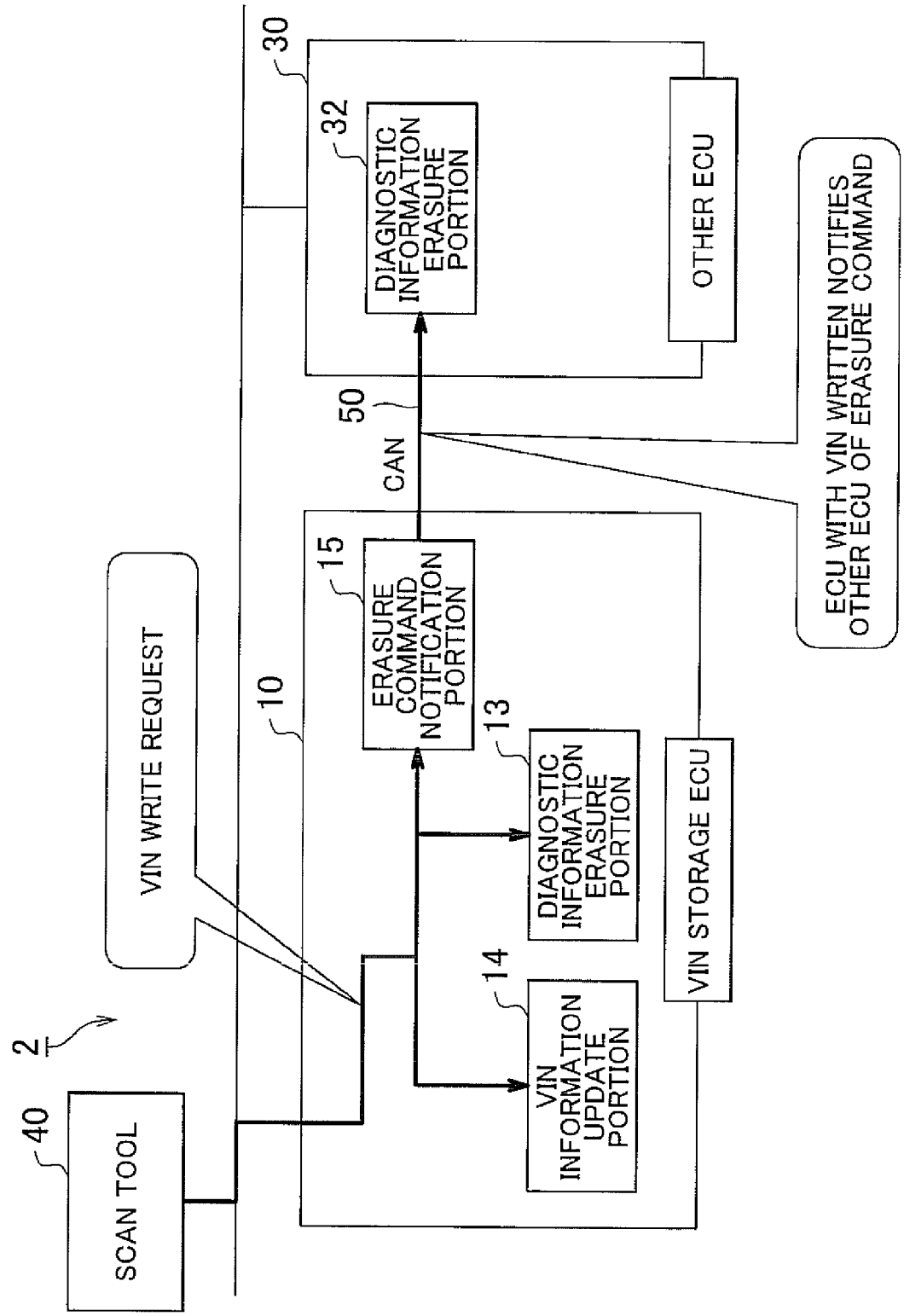
FIG. 6 is a system construction diagram showing a construction of portions of a failure diagnosis system according to a second embodiment of the invention.

FIG. 6 is a system construction diagram showing a construction of portions of a failure diagnosis system 2 according to a second embodiment of the invention. In the second embodiment, substantially the same constructions and the like as the first embodiment as described above are represented with the reference numerals. In FIG. 6, the flows of signals and the like of the VIN write request are indicated by arrows, or the like.

The second embodiment, a scan tool 40 is constructed so as to send, together with a VIN write request, the VIN to be written, to a VIN storage ECU 10, in response to a specific input operation from a service person (an input operation for writing the VIN). In the following description, it is assumed that the VIN write request includes information that represents the VIN to be written.

The VIN storage ECU 10, as shown in FIG. 6, includes a diagnostic information erasure portion 13, a VIN information update portion 14, and an erasure command notification portion 15, as main functional portions that are related to the CARB OBD2 regulations.

The diagnostic information erasure portion 13 erases the diagnostic information from the VIN storage ECU 10 in response to the VIN write request from the scan tool 40. Thus, the diagnostic information of the VIN storage ECU 10 is reset to an initial value (e.g., the "UNKNOWN").

The VIN information update portion 14 carries out the VIN writing pursuantly to the VIN write request, in response to the VIN write request from the scan tool 40. Thus, the writing of the VIN is completed.

The erasure command notification portion 15 sends an erasure command to cause the other ECU 30 to erase the diagnostic information, in response to the VIN write request from the scan tool 40. The erasure command may be a signal that is substantially the same as the diagnostic information erasure request from the scan tool 40 described above in conjunction with the first embodiment. The erasure command notification portion 15 sends the erasure command to cause the other ECU 30 to erase the diagnostic information, via an appropriate bus 50 of a CAN (controller area network), for example, as shown in FIG. 6. In the case where a plurality of other ECUs 30 are provided, the erasure command notification portion 15 may send the erasure command by broadcast, or may also be individually sent. Thus, the other ECUs 30 can simultaneously receive the erasure commands. Incidentally, in another example that is substantially equivalent, the erasure command notification portion 15 may send the erasure command to cause the other ECU 30 to erase the diagnostic information, by using as a trigger the resetting of the diagnostic information by the diagnostic information erasure portion 13, instead of sending the erasure command, in response to the VIN write request from the scan tool 40, and may also send the erasure command to cause the other ECU 30 to erase the diagnostic information, by using as a trigger the VIN writing being carried out by the VIN information update portion 14.

The other ECU 30, as shown in FIG. 6, includes a diagnostic information erasure portion 32 as a main functional portion that is related to the CARB OBD2 regulations.

The diagnostic information erasure portion 32, as shown in FIG. 6, erases the diagnostic information from the other ECU 30 in response to the erasure command from the erasure command notification portion 15 of the VIN storage ECU 10. Thus, the diagnostic information of the other ECU 30 is reset to the initial value (e.g., the "UNKNOWN"). It is to be noted herein that the erasure command from the erasure command notification portion 15 of the VIN storage ECU 10 is sent to the other ECU 30, where the VIN write request is output from the scan tool 40. Therefore, if the VIN write request is output from the scan tool 40, the diagnostic information related to emissions in the VIN storage ECU 10 and the other ECU 30 can be entirely erased simultaneously with the carrying-out of the VIN writing. That is, in the second embodiment, a user (typically, a service person) who desires to perform the writing of a VIN (that includes the re-writing of the present VIN with a new VIN) needs merely to operate the scan tool 40 so as to input (send) the VIN write request from the scan tool 40 to the vehicle side.

Thus, according to the second embodiment, at the time of the VIN writing, the diagnostic information related to emissions can be entirely erased, utilizing the existing functions of the scan tool 40 (the function of outputting the VIN write request). That is, even in the case where the diagnostic information related to emissions is stored in a plurality of ECUs (the VIN storage ECU 10 and the other ECU 30), the diagnostic information related to emissions can be entirely erased at the time of the VIN writing. Besides, since the system is constructed so that the VIN writing is accompanied by the erasure of the entire diagnostic information related to emissions, it is possible to certainly prevent the VIN writing from being carried out with a portion of the emission-related diagnostic information left unerased. That is, since the diagnostic information erasure process is automatically executed if there is a VIN write request, it is possible to certainly prevent the VIN writing from being carried out with a portion of the diagnostic information left unerased. Besides, the user can perform both the VIN write request and the diagnostic information erasure request by one operation, so that the VIN writing work can be facilitated.

Although in the second embodiment, the VIN write request is sent directly from the scan tool 40 to the diagnostic information erasure portion 13 of the VIN storage ECU 10, the diagnostic information erasure request may also be sent to both the VIN storage ECU 10 and the other ECU 30 together when the erasure command notification portion 15 receives the VIN write request. Besides, in that case, the erasure command notification portion 15 may be incorporated in one of the VIN storage ECU 10 and the other ECU 30, or may also be disposed at a location other than the VIN storage ECU 10 and the other ECU 30.

FIG. 7 is a system construction diagram showing a construction of portions of a failure diagnosis system 3 according to a third embodiment of the invention. In the third embodiment, substantially the same constructions as those in the first embodiment or the second embodiment are represented by the same reference numerals. In FIG. 7, the flow of a composite signal (described below) is shown by arrows.

The third embodiment, a scan tool 40 is constructed so as to send (broadcast) a composite signal made up of a VIN write request and a diagnostic information erasure request simultaneously to a VIN storage ECU 10 and an other ECU 30, in response to a specific input operation from a service person (an input operation for writing the VIN). In the following description, it is assumed that the VIN write request includes information that represents the VIN to be written. The composite signal made up of the VIN write request and the diagnostic information erasure request may be a signal that has a data structure in which each of the request information pieces is incorporated, or may also be provided in such a form that the VIN write request and the diagnostic information erasure request are continuously and separately sent by the time-division multiplex method.

The VIN storage ECU 10, as shown in FIG. 7, includes a diagnostic information erasure portion 13 and a VIN information update portion 14 as main functional portions that are related to the CARB OBD2 regulations.

The diagnostic information erasure portion 13, in response to the composite signal from the scan tool 40, erases the diagnostic information from the VIN storage ECU 10 pursuantly to the diagnostic information erasure request contained in the composite signal. Thus, the diagnostic information of the VIN storage ECU 10 is reset to an initial value (e.g., the "UNKNOWN").

The VIN information update portion 14, in response to the composite signal from the scan tool 40, carries out the VIN writing pursuantly to the VIN write request contained in the composite signal. Thus, the writing of the VIN is completed.

The other ECU 30, as shown in FIG. 7, includes a diagnostic information erasure portion 32 as a main functional portion that is related to the CARB OBD2 regulations.

As shown in FIG. 7, the diagnostic information erasure portion 32, in response to the composite signal from the scan tool 40, erases the diagnostic information from the other ECU 30 pursuantly to the diagnostic information erasure request contained in the composite signal. Thus, the diagnostic information of the other ECU 30 is reset to the initial value (e.g., the "UNKNOWN"). It is to be noted herein that the composite signal from the scan tool 40 is broadcast from the scan tool 40 to the VIN storage ECU 10 and the other ECU 30, in a form that contains the VIN write request. Therefore, in the case where the composite signal is input from the scan tool 40, the diagnostic information related to emissions can be entirely erased from the VIN storage ECU 10 and the other ECU 30, simultaneously with the carrying-out of the VIN writing. That is, in the third embodiment, a user (typically, a service person) who desires to perform the writing of a VIN (that includes the re-writing of the present VIN with a new VIN) needs merely to operate the scan tool 40 so as to input (send) the VIN write request from the scan tool 40 to the vehicle side.

According to the third embodiment, by expanding the functions of the scan tool 40 so as to develop a communications standard in which the VIN write request and the diagnostic information erasure request can be simultaneously carried out, it becomes possible to entirely erase the emission-related diagnostic information at the time of the VIN writing. That is, even in the case where the diagnostic information related to emissions is stored in a plurality of ECUs (the VIN storage ECU 10 and the other ECU 30), the diagnostic information related to emissions can be entirely erased at the time of the VIN writing. Besides, since the system is constructed so that the VIN writing is accompanied by the erasure of the entire diagnostic information related to emissions, it is possible to certainly prevent the VIN writing from being carried out with a portion of the emission-related diagnostic information left unerased. That is, since the VIN write request and the diagnostic information erasure request are simultaneously carried out in all cases, it is possible to certainly prevent the VIN writing from being carried out with a portion of the diagnostic information left unerased. Besides, the user can make both the VIN write request and the diagnostic information erasure request by one operation, so that the VIN writing work can be facilitated.

Besides, in the third embodiment, the scan tool 40 is constructed so as to send the composite signal made up of the VIN write request and the diagnostic information erasure request, simultaneously to the VIN storage ECU 10 and the other ECU 30. However, the scan tool 40 may also constructed so as to send the VIN write request and the diagnostic information erasure request separately, as in Embodiments 1 and 2. In that case, it suffices that the other ECU 30 be constructed so as to further include a portion that converts the VIN write request into the diagnostic information erasure signal.

While preferred embodiments of the invention have been described above, the invention is not restricted by any of the foregoing embodiments, but various modifications and replacements may be made in the foregoing embodiments without departing from the scope of the invention. (While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.)

For example, although the foregoing embodiments are intended to comply with the CARB OBD2 regulations, it is also possible to carry out the invention in order to comply with other similar regulations or self-imposed controls or the like.

In the foregoing embodiments, the erasure of the diagnostic information from the VIN storage ECU 10 and the other ECU 30, and the writing of the VIN into the VIN storage ECU 10 may also be performed simultaneously, or the VIN storage ECU 10 and the other ECU 30 may also be controlled so that the erasure of the diagnostic information from the VIN storage ECU 10 and the other ECU 30 is carried out prior to the writing of the VIN into the VIN storage ECU 10.

The failure diagnosis system in accordance with the invention is characterized in that the other ECU is constructed so as to erase the diagnostic information stored in the other ECU when the other ECU receives a diagnostic information erasure request, and in that the failure diagnosis system includes erasure request means for sending the diagnostic information erasure request to the other ECU.

The failure diagnosis system in accordance with the invention is characterized in that the erasure request means is realized by the VIN storage ECU, and in that the VIN storage ECU is constructed so as to send the diagnostic information erasure request to the other ECU, in connection with the writing of a vehicle identification number.

The failure diagnosis system in accordance with the invention is characterized in that the erasure request means is realized by a device that sends a vehicle identification number write request to the VIN storage ECU, and in that the device is constructed so as to send the vehicle identification number write request to the VIN storage ECU and also send the diagnostic information erasure request to the other ECU.

The failure diagnosis system in accordance with the invention is characterized in that the vehicle identification number write request and the diagnostic information erasure request are realized by sending a same signal, and in that the device broadcasts the same signal to the VIN storage ECU and the other ECU.

The failure diagnosis system is characterized in that the system includes a device that has a function of sending to the VIN storage ECU a vehicle identification number write request, and a function of sending a diagnostic information erasure request to the VIN storage ECU, and in that the VIN storage ECU is constructed so that when the vehicle identification number write request is received from the device, the VIN storage ECU provisionally registers the vehicle identification number in accordance with the write request, and then, when the diagnostic information erasure request is received from the device, the VIN storage ECU executes erasure of the diagnostic information stored in the VIN storage ECU as well as executes the writing of the vehicle identification number provisionally registered.

The failure diagnosis system in accordance with the invention is characterized in that the other ECU is constructed so that when a diagnostic information erasure request is received, the other ECU erases the diagnostic information stored in the other ECU, and in that the device broadcasts the diagnostic information erasure request to the VIN storage ECU and the other ECU.

The failure diagnosis system in accordance with the invention is characterized in that the diagnostic information is diagnostic information related to emissions from a vehicle, and in that the other ECU is made up of an ECU that has the diagnostic information related to emissions.

What is claimed is:

1. A failure diagnosis system that is applied to a vehicle, comprising:
    a VIN storage ECU that stores a vehicle identification number and diagnostic information; and
    an other ECU that does not store the vehicle identification number but stores the diagnostic information, and which erases the diagnostic information,
    wherein the VIN storage ECU execute erasure of the diagnostic information stored in the VIN storage ECU in connection with execution of writing of the vehicle identification number in the VIN storage ECU and the other ECU executes erasure of the diagnostic information stored in the other ECU upon receiving a diagnostic information erasure request.

2. The failure diagnosis system according to claim 1, wherein:
    the other ECU executes the erasure of the diagnostic information stored in the other ECU, if the other ECU has received the diagnostic information erasure request; and
    the failure diagnosis system includes an erasure request portion that sends the diagnostic information erasure request to the other ECU.

3. The failure diagnosis system according to claim 2, wherein:
    the erasure request portion is realized by the VIN storage ECU; and
    the VIN storage ECU sends the diagnostic information erasure request to the other ECU in connection with the writing of the vehicle identification number in the VIN storage ECU.

4. The failure diagnosis system according to claim 2, wherein:
    the erasure request portion is realized by a device that sends a vehicle identification number write request to the VIN storage ECU; and
    the device is configured to send the vehicle identification number write request to the VIN storage ECU, and to send the diagnostic information erasure request to the other ECU.

5. The failure diagnosis system according to claim 4, wherein:
    the vehicle identification number write request and the diagnostic information erasure request are realized by sending a same signal; and
    the device broadcasts the same signal to the VIN storage ECU and the other ECU.

6. The failure diagnosis system according to claim 1, further comprising a device that has a function of sending a vehicle identification number write request to the VIN storage ECU, and a function of sending a diagnostic information erasure request to the VIN storage ECU,
    wherein if the VIN storage ECU has received the vehicle identification number write request from the device, the VIN storage ECU executes provisional registration of the vehicle identification number relating to the write request,
    wherein then, if the diagnostic information erasure request is received from the device, writing of the provisionally registered vehicle identification number is executed, and erasure of the diagnostic information stored in the VIN storage ECU is executed.

7. The failure diagnosis system according to claim 6, wherein:
    the other ECU executes the erasure of the diagnostic information stored in the other ECU, if the other ECU has received the diagnostic information erasure request; and
    the device broadcasts the diagnostic information erasure request to the VIN storage ECU and the other ECU.

8. The failure diagnosis system according to claim 1, wherein:
    the diagnostic information is diagnostic information related to emissions; and
    the other ECU includes an ECU that has the diagnostic information related to emissions.

9. A vehicle-mounted ECU comprising:
    a storing portion that stores a vehicle identification number and a diagnostic information;
    a registering portion that, if a vehicle identification number write request is received, provisionally registers onto the storing portion the vehicle identification number relating to the write request; and
    a writing portion that, if a diagnostic information erasure request is received from a device, carries out writing of the vehicle identification number by definitively registering onto the storing portion the vehicle identification number provisionally registered, and that erases the diagnostic information presently stored.

10. A vehicle-mounted ECU comprising:
    a storing portion that stores a vehicle identification number and diagnostic information; and
    a writing portion, if a vehicle identification number write request is received, carries out writing of the vehicle identification number onto the storing portion in accordance with the write request, and that erases the diagnostic information presently stored, and that requests an other ECU that does not store a vehicle identification number but stores diagnostic information to erase the diagnostic information presently stored.

* * * * *